United States Patent
Kikkawa et al.

(10) Patent No.: US 12,491,055 B2
(45) Date of Patent: Dec. 9, 2025

(54) INTERDENTAL CLEANING TOOL

(71) Applicant: Kobayashi Pharmaceutical Co., Ltd., Osaka (JP)

(72) Inventors: Tasuku Kikkawa, Osaka (JP); Koki Asayama, Osaka (JP)

(73) Assignee: Kobayashi Pharmaceutical Co., Ltd., Osaka (JP)

( * ) Notice: Subject to any disclaimer, the term of this patent is extended or adjusted under 35 U.S.C. 154(b) by 0 days.

(21) Appl. No.: 18/463,481

(22) Filed: Sep. 8, 2023

(65) Prior Publication Data

US 2023/0414334 A1 Dec. 28, 2023

Related U.S. Application Data

(63) Continuation of application No. 17/418,373, filed as application No. PCT/JP2019/045066 on Nov. 18, 2019, now abandoned.

(30) Foreign Application Priority Data

Dec. 28, 2018 (JP) .................. 2018-248341

(51) Int. Cl.
A61C 15/02 (2006.01)
(52) U.S. Cl.
CPC .................. A61C 15/02 (2013.01)
(58) Field of Classification Search
None
See application file for complete search history.

(56) References Cited

U.S. PATENT DOCUMENTS

| 4,280,518 A | 7/1981 | Gambaro |
| 5,775,346 A * | 7/1998 | Szyszkowski ......... A61C 15/00 132/321 |
| 6,085,761 A | 7/2000 | Inaba |

(Continued)

FOREIGN PATENT DOCUMENTS

| DE | 20 2006 019 175 U1 | 7/2007 |
| DE | 10 2016 005 012 A1 | 10/2017 |

(Continued)

OTHER PUBLICATIONS

Transition Definition, Merriam Webster. Accessed Sep. 11, 2024 at https://www.merriam-webster.com/dictionary/transition (Year: 2024).*

(Continued)

*Primary Examiner* — Rachel R Steitz
(74) *Attorney, Agent, or Firm* — Wolf, Greenfield & Sacks, P.C.

(57) ABSTRACT

An interdental cleaning tool that achieves both easy insertion between teeth and improved cleaning effect is provided. The interdental cleaning tool 1 includes a base material portion 10 including a base section 11 and a shaft section 12 extending from the base section 11, and a soft portion 20 covering at least a part of the shaft section 12. The at least the part of the shaft section 12 has a first outer dimension X1 defined in a first direction D1 and a second outer dimension X2, defined in a second direction D3 perpendicular to the first direction D1 and smaller than the first outer dimension X1, in a cross section of the shaft section 12 perpendicular to an axial direction of the shaft section 12.

6 Claims, 7 Drawing Sheets

(56) References Cited

U.S. PATENT DOCUMENTS

| | | | | |
|---|---|---|---|---|
| 6,158,444 | A | * | 12/2000 | Weihrauch .............. A61C 15/02 132/200 |
| 10,195,005 | B2 | | 2/2019 | Wallström et al. |
| 11,026,771 | B2 | | 6/2021 | Kikkawa |
| 11,484,110 | B2 | | 11/2022 | Butz et al. |
| 12,083,723 | B2 | | 9/2024 | Kikkawa |
| 2009/0193603 | A1 | | 8/2009 | Ponzini |
| 2009/0230756 | A1 | | 9/2009 | Crossman |
| 2010/0015567 | A1 | * | 1/2010 | Elbaz ..................... A61C 17/02 433/89 |
| 2010/0024839 | A1 | | 2/2010 | Kalbfeld et al. |
| 2010/0043165 | A1 | | 2/2010 | Juentgen et al. |
| 2011/0226276 | A1 | | 9/2011 | Limongi et al. |
| 2014/0008837 | A1 | | 1/2014 | Eatherton |
| 2014/0123423 | A1 | | 5/2014 | Morgott |
| 2015/0114428 | A1 | | 4/2015 | Kato |
| 2015/0238294 | A1 | * | 8/2015 | Coopersmith ......... A61C 15/02 132/329 |
| 2015/0257861 | A1 | | 9/2015 | Dishon |
| 2015/0282601 | A1 | | 10/2015 | Butz et al. |
| 2015/0335141 | A1 | * | 11/2015 | Schär ..................... A46B 5/02 15/159.1 |
| 2016/0058531 | A1 | | 3/2016 | Adriano et al. |
| 2017/0172289 | A1 | * | 6/2017 | Habibi-Naini ......... A46B 5/026 |
| 2017/0216002 | A1 | | 8/2017 | Butz |
| 2017/0319309 | A1 | | 11/2017 | Gengyo et al. |
| 2017/0319310 | A1 | | 11/2017 | Gengyo et al. |
| 2018/0168783 | A1 | * | 6/2018 | Kato ...................... A46B 3/005 |
| 2019/0090623 | A1 | | 3/2019 | Görich et al. |
| 2019/0183617 | A1 | * | 6/2019 | Pötsch ................... A61C 15/02 |
| 2019/0289984 | A1 | | 9/2019 | Fischer |
| 2019/0343608 | A1 | | 11/2019 | Kikkawa et al. |
| 2020/0188071 | A1 | | 6/2020 | Kikkawa |
| 2020/0189159 | A1 | | 6/2020 | Kikkawa |
| 2020/0260853 | A1 | * | 8/2020 | Zwimpfer .......... A46B 15/0038 |
| 2020/0405462 | A1 | | 12/2020 | Petersen |
| 2022/0047365 | A1 | | 2/2022 | Kikkawa et al. |
| 2022/0063155 | A1 | | 3/2022 | Kikkawa |
| 2022/0087796 | A1 | | 3/2022 | Kikkawa |

FOREIGN PATENT DOCUMENTS

| | | | | |
|---|---|---|---|---|
| EP | 2 882 313 | B1 | | 11/2016 |
| JP | 2001-506514 | A | | 5/2001 |
| JP | D1421422 | S | | 8/2011 |
| JP | 2013-188299 | A | | 9/2013 |
| JP | 2013-192866 | A | | 9/2013 |
| JP | D1489187 | S | | 12/2013 |
| JP | D1492452 | S | | 2/2014 |
| JP | D1492453 | S | | 2/2014 |
| JP | D1492784 | S | | 2/2014 |
| JP | 2016-087362 | A | | 5/2016 |
| JP | 2016-104383 | A | | 6/2016 |
| JP | 5929346 | B2 | * | 6/2016 |
| JP | 2016-131602 | A | | 7/2016 |
| JP | 2017-000762 | A | | 1/2017 |
| JP | 2017-000775 | A | | 1/2017 |
| JP | 2017-000776 | A | | 1/2017 |
| JP | 2017-118959 | A | | 7/2017 |
| JP | 2017119095 | A | * | 7/2017 |
| JP | 2017-136202 | A | | 8/2017 |
| JP | 6292246 | B2 | | 3/2018 |
| JP | 2018-140088 | A | | 9/2018 |
| JP | 2018-158004 | A | | 10/2018 |
| WO | WO 2013/176297 | A1 | | 11/2013 |
| WO | WO 2014/005659 | A1 | | 1/2014 |
| WO | WO 2014/054011 | A1 | | 4/2014 |
| WO | WO 2016/020029 | A1 | | 2/2016 |
| WO | WO 2016/076373 | A1 | | 5/2016 |
| WO | WO 2016/167191 | A1 | | 10/2016 |
| WO | WO 2018/124302 | A1 | | 7/2018 |
| WO | WO 2022/243505 | A1 | | 11/2022 |

OTHER PUBLICATIONS

JP-2017119095-A, English Translation Dec. 19, 2016, EPO Global Dossier, Description (Year: 2016).*
Kato, JP-5929346-B2 English Translation, Mar. 12, 2025, Espacenet, Description (Year: 2025).*
Notice of Submission of Information for Japanese Application No. 2018-248342, Appeal No. Fufuku 2023-14939, filed Dec. 7, 2023.
Reason for Submission for Japanese Application No. 2018-248342, Appeal No. Fufuku 2023-14939, filed Dec. 7, 2023.
Notice of Submission of Information for Japanese Application No. 2018-248343, Appeal No. Fufuku 2023-19212, filed Dec. 7, 2023.
Reason for Submission for Japanese Application No. 2018-248343, Appeal No. Fufuku 2023-19212, filed Dec. 7, 2023.
[No Author Listed] Detailed drawings of JPD1489187S: copies of the front view, the plan view and the A-A' end view of JPD1489187S, with the name of each component, etc. being added. JPD1489187S issued Dec. 27, 2013. 1-6.
[No Author Listed] Detailed drawings of JPD1492452S: copies of the front view and the right side view of JPD1492452S, with the name of each component, etc. being added. JPD1492452S issued Feb. 14, 2014. 1-4.
[No Author Listed] Detailed drawings of JPD1492453S: copies of the front view and the right side view of JPD1492453S, with the name of each component, etc. being added. JPD1492453S issued Feb. 14, 2014. 1-4.
[No Author Listed] Detailed drawings of JPD1492784S: copies of the front view and the right side view of JPD1492784S, with the name of each component, etc. being added. JPD1492784S issued Feb. 14, 2014. 1-4.
Notice of Submission of Information for Japanese Application No. 2018-248342, dated Jan. 30, 2025.
Translation of Submission of Information for Japanese Application No. 2018-248342, dated Jan. 30, 2025.
[No Author Listed] Dental Pro Silicone Rubber Interdental Brush Usable for All Teeth from Front Teeth to Back Teeth. dentalpro.com. The Wayback Machine—https://web.archive.org/web/20130819212527/http://dentalpro.co.jp/product/interdentalbrush/silicon.html. [last accessed Jan. 30, 2025] 4 pages.
Kikkawa et al., Interdental cleaning tool. Co-pending U.S. Appl. No. 17/418,373, filed Jun. 25, 2021.
Kikkawa et al., Interdental cleaning tool. Co-pending U.S. Appl. No. 18/463,481, filed Sep. 8, 2023.
Kikkawa, Interdental cleaning tool. Co-pending U.S. Appl. No. 17/418,435, filed Jun. 25, 2021.
International Search Report and Written Opinion for International Application No. PCT/JP2019/045066, mailed Jan. 21, 2020.
Notice of Submission of Publications for Japanese Application No. 2018-248342, dated May 19, 2023.
Reason for Submission for Japanese Application No. 2018-248342, dated May 23, 2023.
[No Author Listed] 2011 Good Design Award, Silicone Rubber Interdental Brush. Japan Institute of Design Promotion. https://www.g-mark.org/en/gallery/winners/9d78119a-803d-11ed-862b-0242ac130002?years=2011. 2011:1-8.
[No Author Listed] Labeled drawings corresponding to JP D1421422 S: front view, bottom view, A-A cross-sectional view, C-C partially enlarged view, and reference perspective view. Aug. 22, 2011:1-4.
[No Author Listed] Dental Pro Silicone Rubber Interdental Brush (12 pieces). Yodobashi. https://www.yodobashi.com/product/100000001001664834/. Date first available Dec. 16, 2012:1-4.
[No Author Listed] Photographs showing dimensions of Dental Pro Silicone Rubber Interdental Brush (12 pieces). Photos undated; product first available Dec. 2012:1-2.
Kikkawa, Method for manufacturing interdental cleaning tool. Co-pending U.S. Appl. No. 17/418,437, filed Jun. 25, 2021.
U.S. Appl. No. 17/418,437, filed Jun. 25, 2021, Kikkawa.
U.S. Appl. No. 17/418,373, filed Jun. 25, 2021, Kikkawa et al.
U.S. Appl. No. 17/418,435, filed Jun. 25, 2021, Kikkawa.
PCT/JP2019/045066, Jan. 21, 2020, International Search Report and Written Opinion.
JP2018-248342, May 19, 2023, Notice of Submission of Publications.

(56) References Cited

OTHER PUBLICATIONS

JP2018-248342, May 23, 2023, Reason for Submission.

* cited by examiner

INTERDENTAL CLEANING TOOL

CROSS-REFERENCE TO RELATED APPLICATIONS

This is a continuation which claims priority to U.S. patent application Ser. No. 17/418,373, filed Jun. 25, 2021, which is a national stage filing under 35 U.S.C. § 371 of International Application No. PCT/JP2019/045066, filed Nov. 18, 2019, which claims priority to Japanese Application No. 2018-248341, filed Dec. 28, 2018, each of which is herein incorporated by reference in its entirety.

TECHNICAL FIELD

The present invention relates to an interdental cleaning tool.

BACKGROUND ART

Conventionally, interdental cleaning tools for cleaning the spaces between the teeth are known. For example, Patent Document 1 discloses an interdental cleaning tool that includes a base material portion made of a synthetic resin and a soft portion made of an elastomer. The base material portion includes a flat handle section, which serves as a handle, and an elongated core base material section, which extends from the distal end of the handle section. The soft portion includes a covering section, which covers at least a part of the core base material section, and a plurality of projections, which extend from the surface of the covering section.

CITATION LIST

Patent Document

Patent Document 1: WO 2013/176297

SUMMARY

Technical Problem

The core base material section of an interdental cleaning tool is usually formed in a substantially conical (tapered) shape reducing in diameter toward the distal end thereof, and designed to allow cleaning of a certain range of interdental spaces ranging from relatively narrow to relatively wide spaces. However, the thick part of the core base material section designed for cleaning wide spaces between teeth has higher strength because of the thickness, hence, it has poor conformability to the interdental space, causing an issue that it is prone to break when forcibly inserted between the teeth. This issue occurs evidently, in particular, in a core base material section having a diameter (including the elastomer portion) of 1.5 mm or more, which is generally referred to as size L. This issue cannot be resolved simply by making the core base material section thinner because of users' need to thoroughly clean the space between teeth that is, in particular, relatively wide, by firmly pressing the tool with a strong shaft.

Accordingly, an object of the present invention is to provide an interdental cleaning tool that achieves both easy insertion between teeth and improved cleaning effect.

Solution to Problem

An interdental cleaning tool according to one aspect of the present invention includes a base material portion including a base section and a shaft section extending from the base section; and a soft portion covering at least a part of the shaft section, wherein the at least the part of the shaft section has a first outer dimension defined in a first direction and a second outer dimension, defined in a second direction perpendicular to the first direction and smaller than the first outer dimension, in a cross section of the shaft section perpendicular to an axial direction of the shaft section.

According to this aspect, a cross section of at least the part of the shaft section has a first outer dimension defined in a first direction and a second outer dimension defined in a second direction perpendicular to the first direction and smaller than the first outer dimension. Consequently, the shaft section flexes more easily in the second direction of the second outer dimension which is smaller, while it does not flex as easily in the first direction of the first outer dimension. In other words, the shaft section has increased strength in the first direction. Therefore, easy insertion between the teeth can be realized through use of the interdental cleaning tool in a way that lets the tool flex in the second direction in which it can flex more easily. On the other hand, the cleaning effect can be increased through use of the interdental cleaning tool which is firmly pressed against the teeth in the first direction in which it flexes less easily, because this allows the soft portion to be pressed against the side faces of the teeth more firmly. Therefore, this interdental cleaning tool can achieve both easy insertion between teeth and improved cleaning effect.

In the aspect described above, the first outer dimension is preferably defined in a direction parallel to a plane extending along the base section. The first outer dimension and the second outer dimension preferably have a ratio (second outer dimension/first outer dimension) of 0.20 to 0.98. The second outer dimension is preferably 1.0 mm or more. Moreover, the soft portion preferably has a length, defined in an axial direction of the shaft section, of 15 mm or more. Additionally, the first outer dimension and the second outer dimension may have a ratio (second outer dimension/first outer dimension) gradually decreasing from a distal end section toward the base section of the shaft section.

Advantageous Effects of Invention

The present invention can provide an interdental cleaning tool that achieves both easy insertion between teeth and improved cleaning effect.

DESCRIPTION OF EMBODIMENTS

Figure 1:
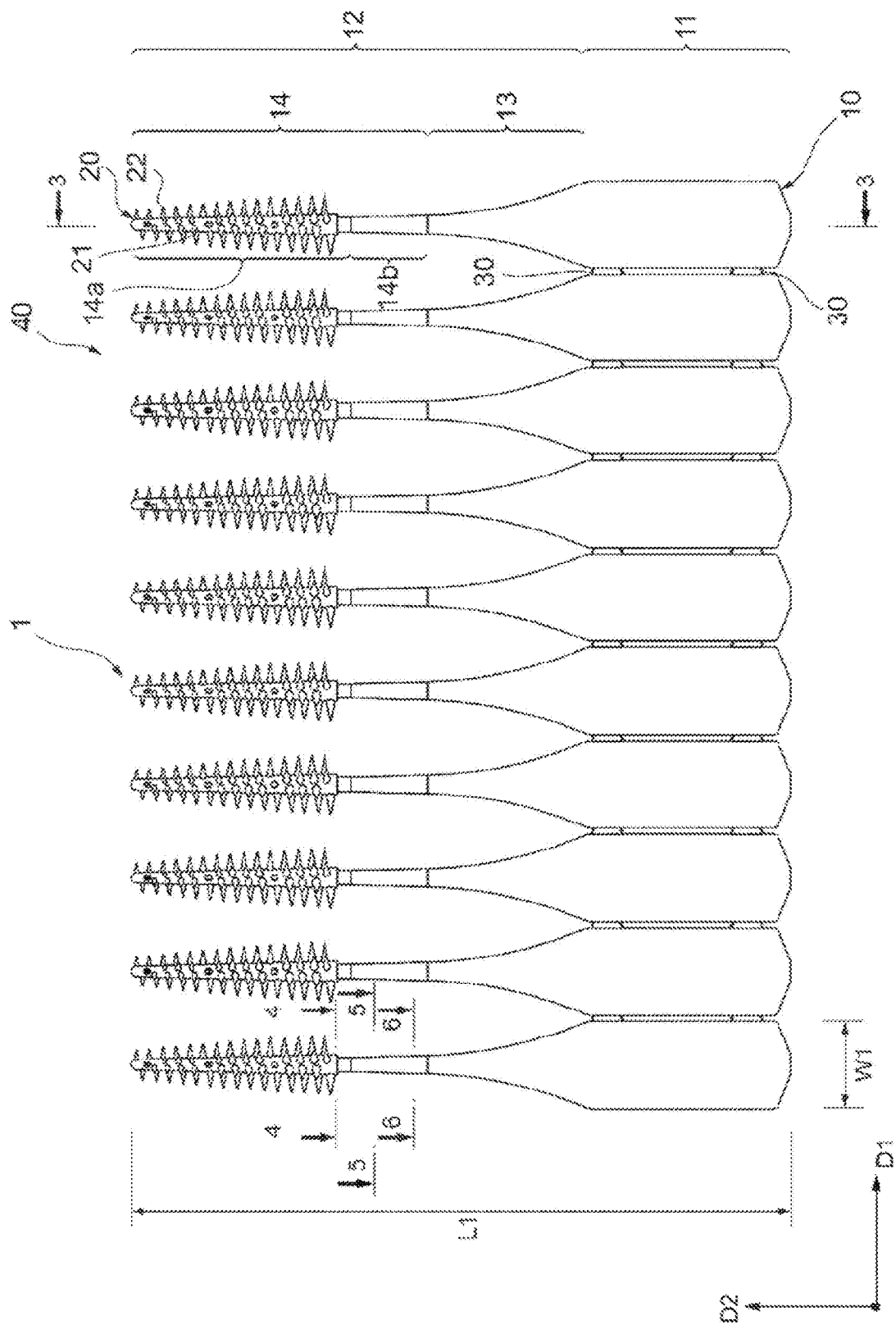
FIG. 1 is a schematic front view showing the structure of an interdental cleaning tool according to one embodiment of the present invention.
Figure 2:
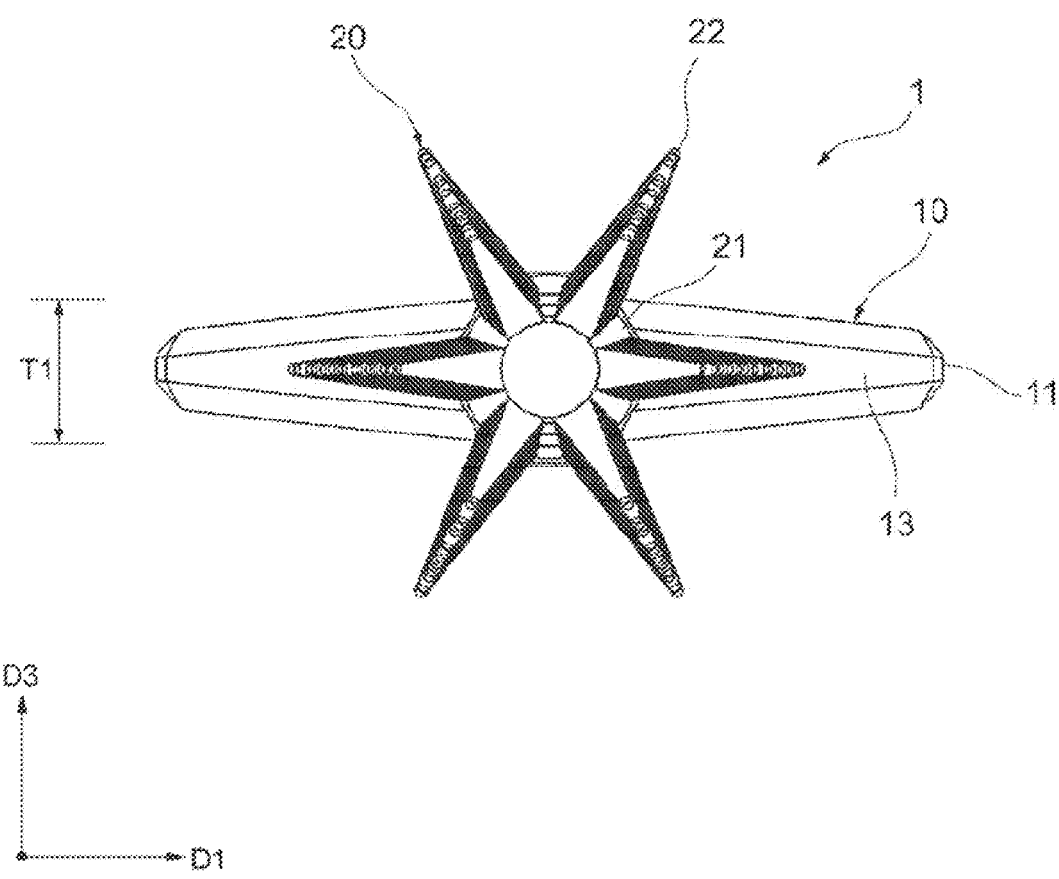
FIG. 2 is a schematic side view showing the structure of the interdental cleaning tool according to one embodiment of the present invention.
Figure 3:
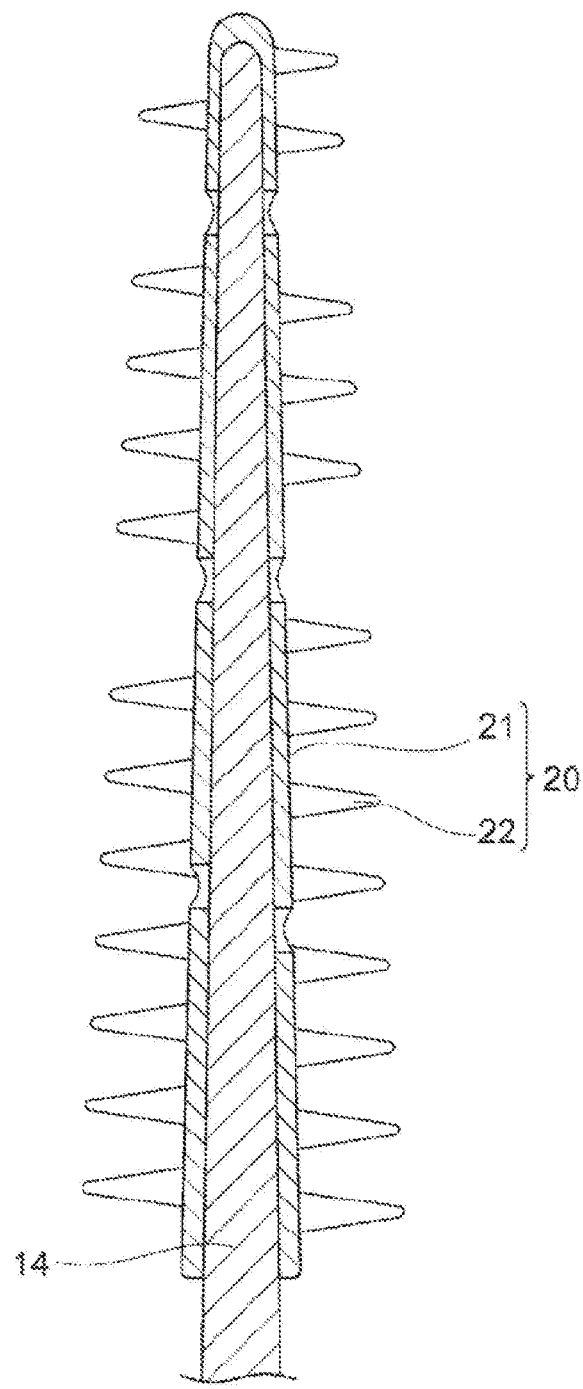
FIG. 3 is a cross-sectional view along line 3-3 of FIG. 1.

A preferred embodiment of the present invention will be described with reference to the accompanying drawings. As shown in FIG. 1 to FIG. 3, the interdental cleaning tool 1 according to one embodiment of the present invention includes a base material portion 10, and a soft portion 20 covering at least part of the base material portion 10. The interdental cleaning tool 1 is individually cut off and separated from a connected member 40 of, for example, 10 interdental cleaning tools 1 joined together in parallel along a lateral direction (first direction) D1 of the interdental cleaning tool 1 by a pair of connecting sections 30, 30 formed, for example, on the base material portion 10.

The base material portion 10 includes a base section 11 for a user to hold, and a shaft section 12 extending from the distal end of the base section 11 along a longitudinal direction D2 perpendicular to the lateral direction D1 of the interdental cleaning tool 1 to be inserted between the teeth of the user. Herein, the side toward the shaft section 12 as viewed from the base section 11 is referred to as the distal side, and the side toward the base section 11 as viewed from the shaft section 12 is referred to as the proximal side.

The base section 11 is formed in a flat, wide plate-like shape, for example. In this embodiment, for example, it is formed in a flat cuboidal shape, but may be formed in other shapes as long as the user can hold it.

The shaft section 12 extends from the distal end that is one end of the base section 11 along the longitudinal direction D2. The shaft section 12 includes a transition section 13 continuing from the base section 11 and extending in a flat plate-like shape, and a distal end section 14 extending from the distal end of the transition section 13 to the distal end of the shaft section 12 in a thin pin-like shape. The transition section 13 is formed in a tapered shape wherein the width defined along the lateral direction D1 is reduced toward the distal end of the shaft section 12.

The base material portion 10 is molded from a synthetic resin material, for example. Synthetic resin materials that can be adopted include, for example, polypropylene, polyethylene, ABS (acrylonitrile butadiene styrene), polybutylene terephthalate, polycarbonate, polyethylene terephthalate, polystyrene, polyacetal, polyamide, and so on. The synthetic resin material may additionally contain a fiber material such as glass fiber in a ratio of about 1 to 30 weight %, for example.

The soft portion 20 includes a covering section 21 that covers an outer circumferential surface of at least part of the distal end section 14 of the shaft section 12, and a plurality of projections 22 projecting from the covering section 21. The projections 22 are formed in a conical shape, for example, and arranged helically around the axis of the distal end section 14 of the shaft section 12 from the proximal end to the distal end of the covering section 21. The height of the projections 22 from the outer circumferential surface of the covering section 21 decreases from the proximal end to the distal end of the covering section 21.

The soft portion 20 is made of a resin material having a lower hardness than that of the synthetic resin material of the base material portion 10. Elastomer can be adopted as the resin material. Applicable elastomers include styrene-based elastomer, silicone, olefin-based elastomer, polyester-based elastomer, and so on. The elastomer should preferably have a shore A durometer hardness (JISK6253) of 10 to 50, more preferably 10 to 40. In this embodiment, the elastomer has a shore A durometer hardness of 35.

The base material portion 10 of the interdental cleaning tool 1 of this embodiment is designed to have a length L1 defined along the longitudinal direction D2 of 45 mm to 55 mm, for example. The base section 11 is designed to have a width W1 defined along the lateral direction D1 of 3 mm to 10 mm, for example. Further, the base section 11 is designed to have a thickness T1 defined along a thickness direction (second direction) D3 perpendicular to the lateral direction D1 and longitudinal direction D2 of 0.5 mm to 10 mm, for example.

The covering section 21 is designed to have a length defined along the longitudinal direction D2 from its proximal end to the distal end of 10 mm to 25 mm, for example. The covering section 21 is formed with a uniform thickness at the same position in the longitudinal direction D2, the thickness being 0.1 mm to 2.5 mm, for example. The projections 22 are designed to have a height from the outer circumferential surface of the covering section 21 of 0.1 mm to 5.0 mm, for example. The issue the present invention is meant to solve mentioned above is more prone to arise when the covering section 21 is longer, meaning, the longer the covering section, the more the effect of the invention is achieved. In this respect, the length of the covering section 21 defined along the longitudinal direction D2 should preferably be 15 mm or more, more preferably 16 mm or more, and particularly preferably 18 mm or more.

Figure 4:
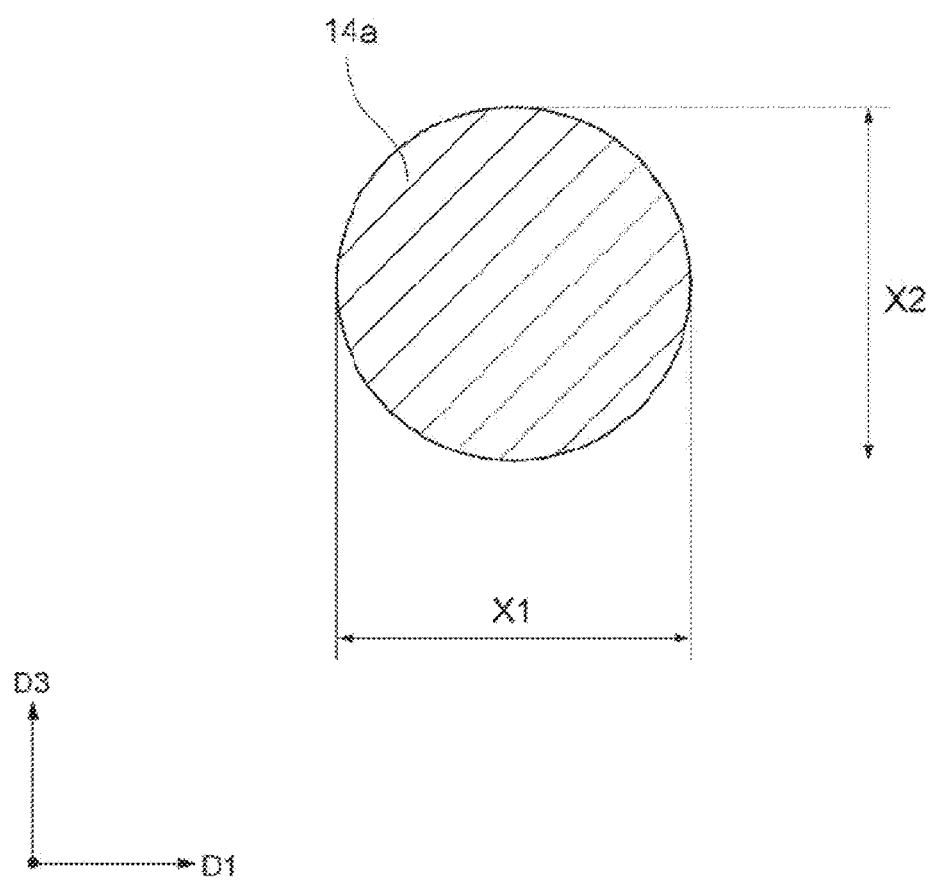
FIG. 4 is an end face view along line 4-4 of FIG. 1.

The distal end section 14 includes a distal end region 14a extending from the distal end toward the proximal end thereof, and a proximal end region 14b extending from the distal end region 14a to the transition section 13. At least part of the distal end region 14a is covered by the covering section 21. As shown in FIG. 4, the distal end region 14a is designed to have a substantially true-circle cross section perpendicular to the axis of the shaft section 12. The distal end region 14a is formed in a tapered shape, radially reducing from the proximal end toward the distal end thereof, its diameter (i.e., first outer dimension X1 defined along the lateral direction D1, or second outer dimension X2 defined along the thickness direction D3) being 0.6 mm to 3.0 mm, for example. In this embodiment, the distal end region 14a is designed to have a length from the distal end to the proximal end of the soft portion 20 of 15 mm, and the proximal end region 14b is similarly designed to have a length of 5 mm.

Figure 5:
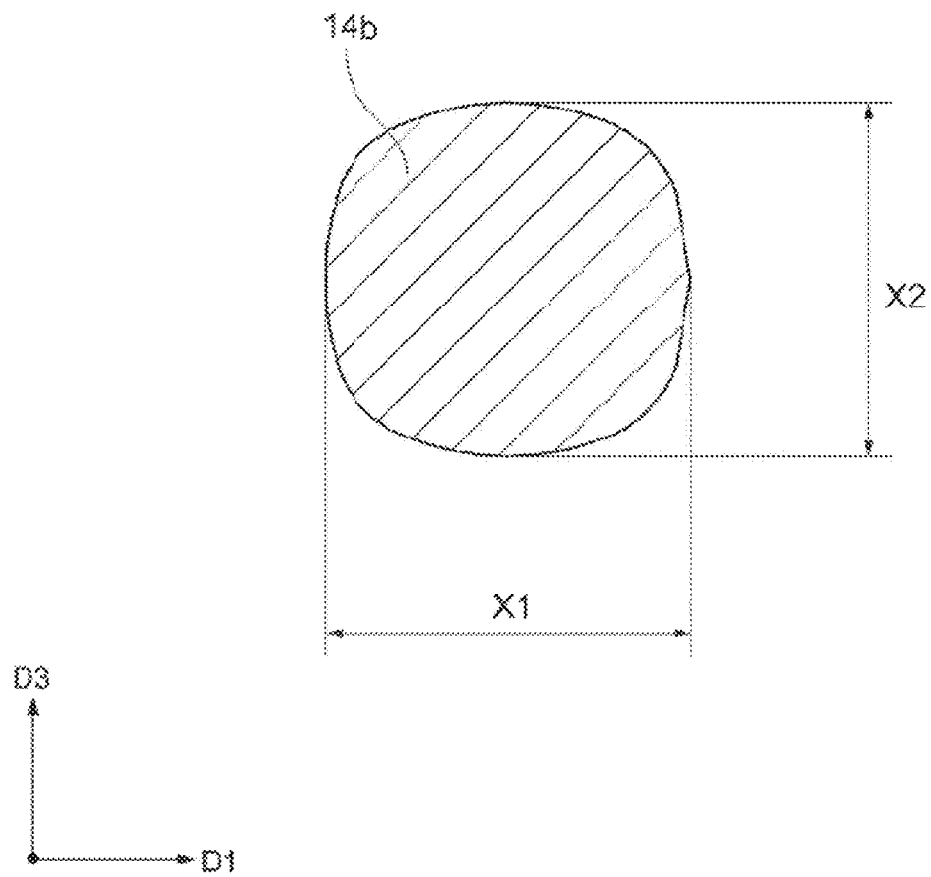
FIG. 5 is an end face view along line 5-5 of FIG. 1.
Figure 6:
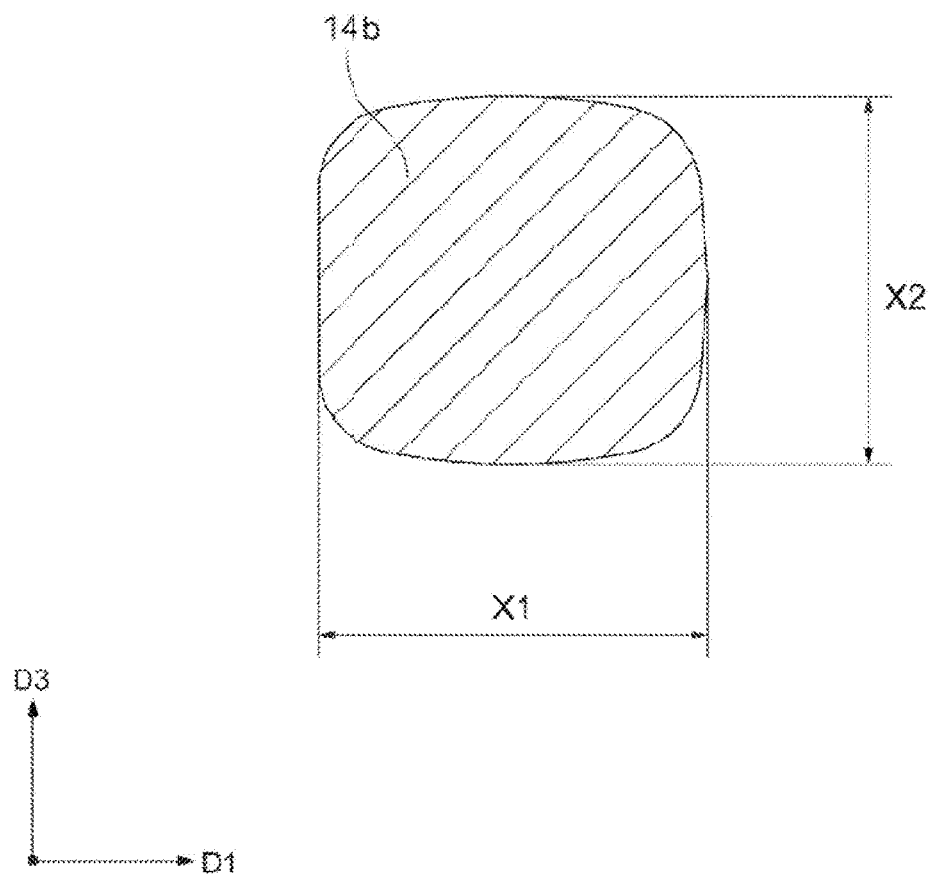
FIG. 6 is an end face view along line 6-6 of FIG. 1.
Figure 7:
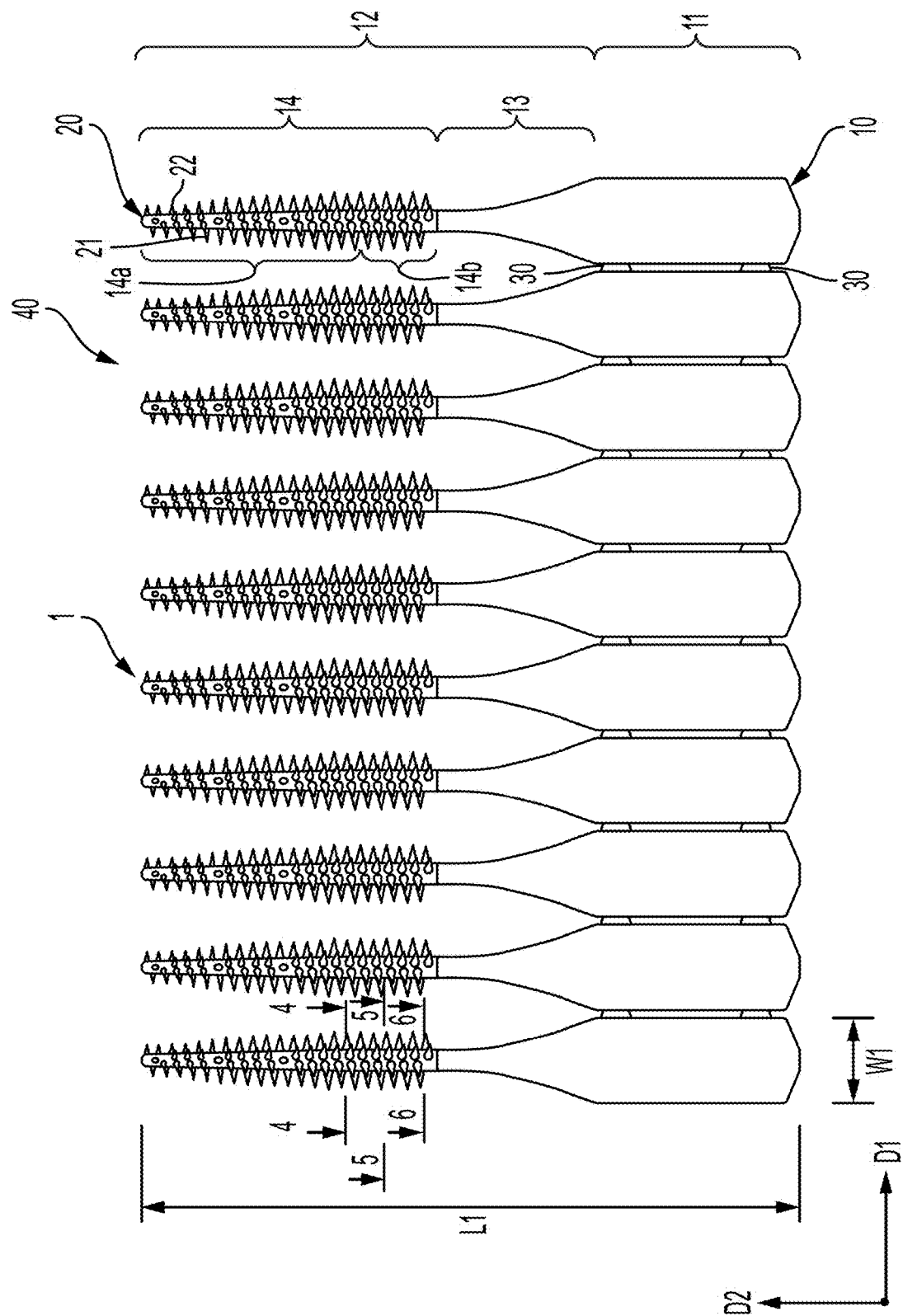
FIG. 7 is a schematic front view showing the structure of an interdental cleaning tool according to one embodiment.

On the other hand, as shown in FIG. 5 and FIG. 6, the proximal end region 14b is designed to have a cross section whose first outer dimension X1 defined along the lateral direction D1 is larger than the second outer dimension X2 defined along the thickness direction D3 perpendicular to the lateral direction D1. The second outer dimension X2 of the proximal end region 14b should preferably be set to 1.0 mm or more, and more preferably 1.1 mm or more. The ratio between the first outer dimension X1 and the second outer dimension X2 (X2/X1) is set to 0.20 to 0.98, and may more preferably be 0.30 to 0.97. This ratio (X2/X1) may be set to decrease gradually from a distal end section toward a base section of the proximal end region 14b. Note, X1 denotes the relatively longer one of the first outer dimension X1 and the second outer dimension X2, i.e., the outer dimension along the lateral direction D1 need not necessarily be X1. In this embodiment, the proximal end region is designed to have a cross-sectional shape that transforms to more rectangular from the distal end region 14b toward the transition section 13. For example, while the cross section in FIG. 5 near the distal end region 14b is substantially oval, it is more rectangular near the transition section 13.

The interdental cleaning tool 1 described above allows its shaft section 12 to flex more easily in the thickness direction D3 along the second outer dimension X2, while not allowing the shaft section 12 to flex as easily in the lateral direction D1 along the first outer dimension X1, because of the second outer dimension X2 being smaller than the first outer dimension X1 in the proximal end region 14b of the shaft section 12. In other words, the shaft section 12 has increased strength in the lateral direction D1 as compared to the longitudinal direction D2. Therefore, easy insertion between the teeth can be realized through use of the interdental cleaning tool 1 in a way that lets the tool flex in the thickness direction D3 in which it can flex more easily.

On the other hand, the cleaning effect can be increased through use of the interdental cleaning tool 1 in which it is firmly pressed against the teeth in the lateral direction D1 in which it flexes less easily, because this allows the covering section 21 and projections 22 to be pressed against the side faces of the teeth more firmly. Therefore, easy insertion between teeth and improved cleaning effect can both be achieved.

Since the distal end region 14a located further toward the distal side of the shaft section 12 than the proximal end region 14b is designed to have a substantially true-circle cross section, so that the distal end region 14a can bend in any direction perpendicular to the axis of the shaft section 12. Therefore, in addition to the flexibility in the thickness direction D3 of the proximal end region 14b described above, the degree of bendability of the shaft section 12 when the interdental cleaning tool 1 is inserted between the teeth can further be increased.

Next, a production method of the interdental cleaning tool 1 is described below. First, the filling space of a primary mold conforming to the outer shape of the base material portion 10 is filled with a molten synthetic resin material to mold the base material portion 10. After that, the base material portion 10 is taken out of the primary mold. Then, the molded base material portion 10 is arranged inside the filling space of a secondary mold conforming to the outer shape of the soft portion 20. The filling space is filled with a molten elastomer to mold the soft portion 20. Thus the interdental cleaning tool 1 is mold. After that, the interdental cleaning tool 1 is taken out of the secondary mold.

The covering section 21 and projections 22 of the interdental cleaning tool 1 described above may cover not only the distal end region 14a but also the proximal end region 14b of the shaft section 12. The settings of the first outer dimension X1 and second outer dimension X2 may be applied not only to the proximal end region 14b but also to part or all of the distal end region 14a. The first outer dimension X1 may be set along the thickness direction D3, and the second outer dimension X2 smaller than the first outer dimension X1 may be set along the lateral direction D1.

The embodiment described above is given for facilitating the understanding of the present invention and not for limiting the interpretation of the present invention. Various elements in the embodiment, arrangements, materials, conditions, shapes, sizes and so on are not limited to the shown examples and may be changed as required. Also, various features shown in different forms of embodiment can be partially interchanged or combined.

REFERENCE SIGNS LIST

1 Interdental cleaning tool
10 Base material portion
11 Base section
12 Shaft section
20 Soft portion
D1 Lateral direction (first direction)
D3 Thickness direction (second direction)
X1 First outer dimension
X2 Second outer dimension

What is claimed is:

1. An interdental cleaning tool comprising:
   a base material portion including a base section and a shaft section extending from the base section, the shaft section including a transition section and a distal end section extending from the transition section, wherein the transition section is flat, wherein the distal end section includes a distal end region and a proximal end region, and wherein a cross-sectional of the distal end section gradually transitions from a circle at the distal end region to a rectangular shape at the proximal end region; and
   a soft portion covering the distal end region and the proximal end region of the shaft section, and having projections in at least a part of the distal end region wherein,
   the distal end section of the shaft section is configured with different cross-sectional shapes and cross-sections perpendicular to an axial direction of the shaft section,
   the distal end region is configured with a true-circle cross-section perpendicular to an axial direction of the shaft section, and
   at least a part of the proximal end region of the shaft section has a first outer cross-sectional dimension defined in a first direction and a second outer cross-sectional dimension defined in a second direction perpendicular to the first direction, where the second outer cross-sectional dimension is smaller than the first outer cross-sectional dimension with the first and second outer cross-sectional dimensions each being perpendicular to the axial direction of the shaft section.

2. The interdental cleaning tool according to claim 1, wherein the first outer cross-sectional dimension is defined in a direction parallel to a plane extending along the base section.

3. The interdental cleaning tool according to claim 1, wherein a ratio of the second outer cross-sectional dimension to the first outer cross-sectional dimension is 0.20 to 0.98.

4. The interdental cleaning tool according to claim 1, wherein the second outer cross-sectional dimension is 1.0 mm or more.

5. The interdental cleaning tool according to claim 1, wherein the soft portion has a length, which is defined in the axial direction of the shaft section, of 15 mm or more.

6. The interdental cleaning tool according to claim 1, wherein a ratio of the second outer cross-sectional dimension to the first outer cross-sectional dimension gradually decreases from the distal end region toward the proximal end region of the shaft section.

* * * * *